United States Patent [19]

Vaughan

[11] Patent Number: 4,800,590
[45] Date of Patent: Jan. 24, 1989

[54] COMPUTER KEY AND COMPUTER LOCK SYSTEM

[75] Inventor: James C. Vaughan, Palo Alto, Calif.

[73] Assignee: Willis E. Higgins, Palo Alto, Calif.; a part interest

[21] Appl. No.: 691,225

[22] Filed: Jan. 14, 1985

[51] Int. Cl.[4] .......................... H04K 1/00; G07P 7/00
[52] U.S. Cl. ........................................ 380/25; 380/23; 380/49; 340/825.34; 235/382
[58] Field of Search .......................... 178/22.08, 22.09; 235/379, 380, 382, 487; 380/23-25, 46, 49; 340/825.34, 825.31

[56] References Cited

U.S. PATENT DOCUMENTS

| | | | |
|---|---|---|---|
| 4,126,761 | 11/1978 | Graupe et al. | 178/22.17 |
| 4,145,568 | 3/1979 | Ehrat | 178/22.17 |
| 4,196,310 | 4/1980 | Forman et al. | 380/46 |
| 4,211,919 | 7/1980 | Ugon | 235/487 |
| 4,310,720 | 1/1982 | Check, Jr. | 235/382 |
| 4,326,098 | 12/1982 | Bourcius et al. | 380/24 |
| 4,369,322 | 11/1983 | Campbell, Jr. | 380/49 |
| 4,471,216 | 9/1984 | Herve | 235/380 |
| 4,536,647 | 8/1985 | Atalla et al. | 235/379 |
| 4,599,489 | 7/1986 | Cargile | 380/25 |
| 4,609,777 | 4/1986 | Cargile | 380/25 |
| 4,626,623 | 12/1986 | La Haye | 380/23 |
| 4,710,955 | 12/1987 | Kauffman | 380/20 |

OTHER PUBLICATIONS

"The 60 Second Password", 1984, by Security Dynamics.

"Guard Tour System", by Security Dynamics, Jan. 1984.

*Primary Examiner*—Salvatore Cangialosi
*Attorney, Agent, or Firm*—Flehr, Hohbach, Test, Albritton & Herbert

[57] ABSTRACT

A computer access system includes a password generator (10) and an lock computer (50) connected to receive passwords generated by the password generator and grant access to a host computer (52) when a password from the password generator (10) matches a password separately generated by the lock computer (50). The password generator (10) and the lock computer (50) have corresponding pseudo-random number sequences stored in memories (26 and 90). The password generator (10) and the lock computer (50) have synchronized clocks (30 and 84), which define time intervals. During a given time interval, entry of a personal identification number in password generator (10) will cause the password generator (10) to generate a unique password from the random number sequence in memory (26) and time interval information from clock (30). The user transmits the so-generated password to the lock computer (50), which independently generates a comparison password from the corresponding pseudo-random number sequence stored in memory (90), and the time interval defined by clock (84). If the passwords match, access to computer (52) is granted by the lock computer (50). Since the valid passwords change with each time interval, subsequent use of an intercepted password will not grant access to the computer.

10 Claims, 4 Drawing Sheets

COMPUTER KEY AND COMPUTER LOCK SYSTEM

BACKGROUND OF THE INVENTION

1. Field of the Invention

This invention relates to computer key and computer lock devices and a system incorporating the devices which provides a secure password for remote computer access. More particularly, it relates to a portable device which generates a series of unique passwords which change continually with time. It further relates to an interface which communicates with the password generating device to control access to the computer by receipt of a valid password generated by the password generating device. Together, the password generating device and the interface device constitute a lock and key system for secure remote computer access.

2. Description of the Prior Art

Remote password generating devices and interface devices connected to control access to a computer are known in the art. For example, a system incorporating such devices is disclosed in U.S. Pat. No. 4,310,720, issued Jan. 12, 1982 to Check, Jr. In the system there disclosed, a portable access unit generates a sequential series of access codes, with a different one of the access codes being used each time a computer is accessed with the unit. An access controller connected to the computer generates a corresponding series of access codes. If the access codes generated by the two devices match, the access controller grants access to the computer. The two devices generate the access codes on the basis of a user password and a pseudo-randomly generated number. The devices and system there disclosed provide password security because the password itself is never transmitted and is therefore not subject to interception. However, a significant problem with the system there disclosed is that the portable access unit and the access controller must stay at the same point in the sequential series of access codes. In practice, remote accesses to computers are often interrupted before completion. Also, through user error, an access code may be generated with such a portable access unit when it is not communicating with the access controller. For these reasons, it is very easy for the two access code sequences used in the Check system to be at different points in the sequences, so that the portable access unit is no longer effective for obtaining access to the computer.

A variety of other computer security systems are also known in the art. The problem of computer security has become a very hot issue recently, with the movie "War Games" and the problems with "hackers" finding their way into time-shared computer systems. The problem of computer security is much more widespread than keeping hackers out of ARPANET or starting a war by entering the computers which control our missiles. Making entry into an unauthorized computer system illegal does not physically prevent anyone from entering the system. A computer with no access control is very close to leaving a bank vault door open and then saying that it is illegal to walk in and take the money. Computer systems now contain the accounting systems for a very large number of businesses, both large and small. These books were formerly locked in safes so that competitors would not have access to the information. Now the books are stored on a computer which has a telephone access and is open to anyone who has a terminal or computer with a modem attached to it. The vault doors are now wide open to anyone.

Many computers are protected with a system of passwords. Each user has his own password, and this is the key to the system. However, passwords are notoriously easy to crack. Many people devise passwords which are easy to remember. They use their wife's name, dog's name or even their own name. Most small computers do not have any security at all. A small business person will hook up a personal computer to the telephone lines for remote access, and in effect open the vault doors to anyone.

To prevent unauthorized access, computers which do classified work usually do not have telephone connections. The computers are locked in vaults with combination locks and all the mass storage, such as disks, are protected very carefully. Security for classified computers is very strict, but such techniques are not practical for most applications.

Computers used for unclassified work are not as well protected. Most such computers at best have only password protection. Another commonly used approach is a call back technique. The user calls the computer and will receive a special tone. The user then keys in an access code using the touch tone keys on the telephone. The response from the computer is a distinctive tone or a message asking the user to hang up. Both the computer and the user now hang up the phone and the computer dials the user at a predetermined phone number.

There are a number of disadvantages with a system of this type. First, the user must be at a predetermined telephone number and cannot move around. Sales people and others who need computer access while traveling would have a lot of trouble with this system. Second, someone who is determined to enter the system can defeat it by diverting the phone connection or other techniques.

Some computers utilize a Digital Encryption Standard (DES) encryptor to encode messages transmitted. The DES encryptor is a system developed at IBM and authorized by the National Security Agency to encrypt data commercially. The DES circuit is available from several sources and is quite secure. This approach involves encrypting the whole message and therefore makes the whole transaction secure. For many purposes, this approach is overkill.

Another encryption scheme is called the public key encryption system. This system is based on the use of so-called "trapdoor functions." Trapdoor functions are arithmetic calculations which are easy in one direction but very difficult in the reverse direction. There are several of these functions known. One function is called the Knapsack problem. This method was broken a couple of years ago. Another function is called the RSA algorithm, named after R. Rivest, A. Shamir and L. Adelman at MIT. The RSA algorithm is based on the idea that it is easy to generate a large number by multiplying its prime factors together, but very difficult to find the prime factors of a large number. Recently, someone has factored a 55-digit number on a Cray computer. Given sufficient computer power, the RSA algorithm may someday become insecure. To factor numbers this large, immense computer power is required. The public key system is still pretty safe.

The public key system allows a user to provide a secure signature. The public key system has two keys. The private key is known only to the user, and the public key can be published in a book. If someone wants to send a message to the user, he can look up the user's public key in the book and encode the message using the public key. The user is the only one who can decode the message, using his private key. If the user needs to generate his signature, he can encode a message in his private key and it can be decoded with the public eye. Since he is the only one who can encode the message in his private key, anyone who decodes the message using the public key knows that the user is the only one who could have sent the message. This technique provides an authentic signature, but the public key book must be carefully controlled to prevent an imposter from publishing his own public key in someone else's name. The public key system is a good way to build a password protection system, but it requires an immense amount of computation and very long keys to be effective.

The following additional patents relate generally to data processing system security and password identification: U.S. Pat. No. 3,890,601, issued June 17, 1975 to Pietrolewicz; U.S. Pat. No. 4,218,738, issued Aug. 19, 1980 to Matyas et al.; and U.S. Pat. No. 4,445,712, issued May 1, 1984 to Smagala-Romanoff.

A further indication of the state of the art in computer security and password techniques is supplied by Wood, Charles C., "Effective Information Systems Security with Password Controls", Comput. Secur., Volume II, No. 1, January 1983, pp. 5–10; Calhoun, G., "Decoding the 'Secret End' Password is an Easy Key to Computer Fraud", Telephony, Vol. 204, No. 14, pp. 45–46, 4 April 1983; Dotto, L., "Computer Security - Keeping Data Assets Secure", Can. Datasyst., Vol. 15, No. 2, pp. 30–35, February 1983; and Damerau, F. J., "Terminal Security Via a Light-Pen-Readable Key Card", IBM Tech. Disclosure Bull., Vol. 22, No. 5, p. 2154, October 1979.

Thus, while the art pertaining to computer security is a well developed one, a need still remains for further improvement in devices and systems for controlling computer access, particularly in a commercial environment, and especially for smaller computers.

SUMMARY OF THE INVENTION

Accordingly, it is an object of this invention to provide a computer access system in which a password is separately generated by a remote device and by an interface unit at the computer, on the basis of information that is not transmitted between the remote device and the interface unit at the time of access, which interface unit grants access to the computer if the passwords match, in which access is granted as long as there is a reasonable correspondence between the password sequences generated by the remote device and by the interface unit.

It is another object of the invention to provide such a computer access system having an improved optical interconnection for conditioning the remote device and the interface unit to generate corresponding password sequences.

It is a further object of the invention to provide such a computer access system which utilizes a remote device of simplified construction.

It is still another object of the invention to provide such a computer access system in which the remote device is configured to promote user association with security.

The attainment of these and related objects may be achieved through use of the novel computer access system, remote access device and interface unit herein disclosed. A computer access system in accordance with this invention allows remote access by a user to a computer while maintaining security of the computer against unauthorized remote access. The system includes a plurality of password generators, with each authorized user having one of the password generators. An interface unit remotely accessible by the users is connected to the computer. A means loads equivalent information into one of the password generators and the interface for generation of the passwords. The interface and the password generators each include a clock with the clocks being synchronized at the time the equivalent information is loaded. The equivalent information generates the same passwords at corresponding clock time periods in the one password generator and the interface. The interface is configured so that identity of a transmitted password generated by the password generator during the clock time period with a password generated by the interface allows access to the computer through the interface.

In a preferred form of the invention, the interface is configured to compare a password generated by the password generator with passwords generated by the interface for a plurality of adjacent time periods, in order to compensate for drift between the clock of the interface and the clock of the password generator.

By separately generating the passwords at the remote generator and the interface on the basis of corresponding information in each unit and time periods defined by clocks in each unit, only the password valid for the password generator for the time period in which access to the computer is sought need be transmitted between the password generator and the interface unit. Since that password is valid for only a short time, interception of it by unauthorized persons will not allow access to the computer at a later time. Security of user personal identification numbers or other sensitive information used to generate the passwords is therefore maintained.

The attainment of the foregoing and related objects, advantages and features of the invention should be more readily apparent to those skilled in the art, after review of the following more detailed description of the invention, taken together with the drawings, in which:

DETAILED DESCRIPTION OF THE INVENTION

Figure 1:
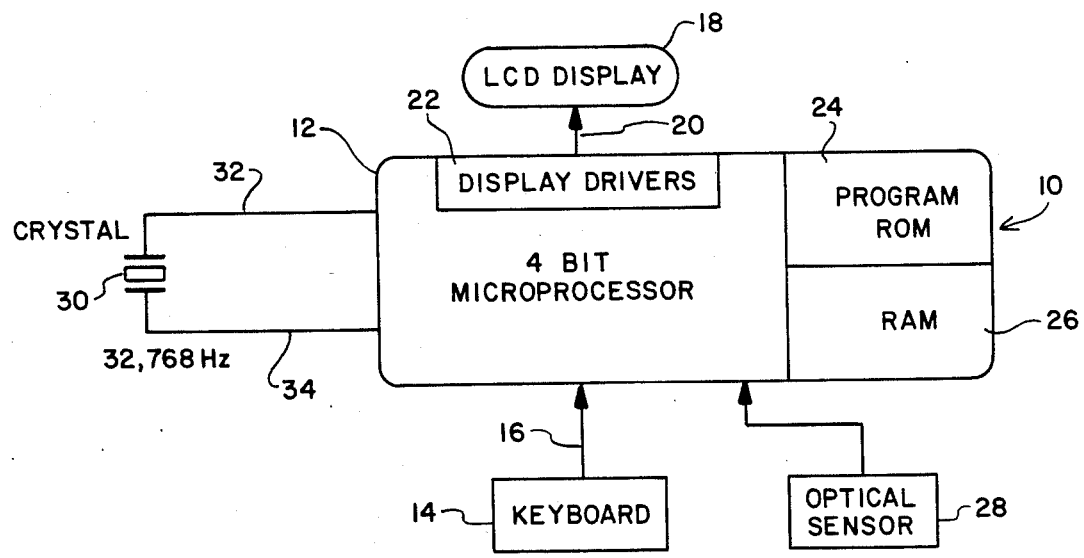
FIG. 1 is a block diagram of a remote password generator in accordance with the invention.

Turning now to the drawings, more particularly to FIG. 1, there is shown a password generator 10 in accordance with the invention. Generator 10 includes a 4 bit microprocessor 12 connected to keyboard 14 by bus 16 and to liquid crystal display 18 by bus 20. The 4 bit microprocessor 12 may be implemented with a single integrated circuit chip that includes display drivers 22 for the liquid crystal display 18, a read only memory (ROM) 24, containing a suitable program as described below for operation of the password generator 10, and a random access memory (RAM) 26 containing a pseudo-random number sequence used by the microprocessor to generate the passwords. An optical sensor 28 is connected to the microprocessor 12 to receive the pseudo-random number sequence from the interface unit 50 (FIG. 2), for storage in the RAM 26. A 32,768 Hz quartz crystal 30 is connected to the microprocessor 12 by lines 32 and 34 and functions as a system clock.

In practice, the 4 bit microprocessor may be implemented with a 5840 type low power CMOS microprocessor integrated circuit, commercially available from Okidata and powered by a lithium battery. Power must be maintained to the RAM 26 in order to maintain the pseudo-random number sequence in memory. Therefore, any attempt to disassemble the password generator 10 to read out the contents of the RAM will result in destruction of the information.

Figure 2:
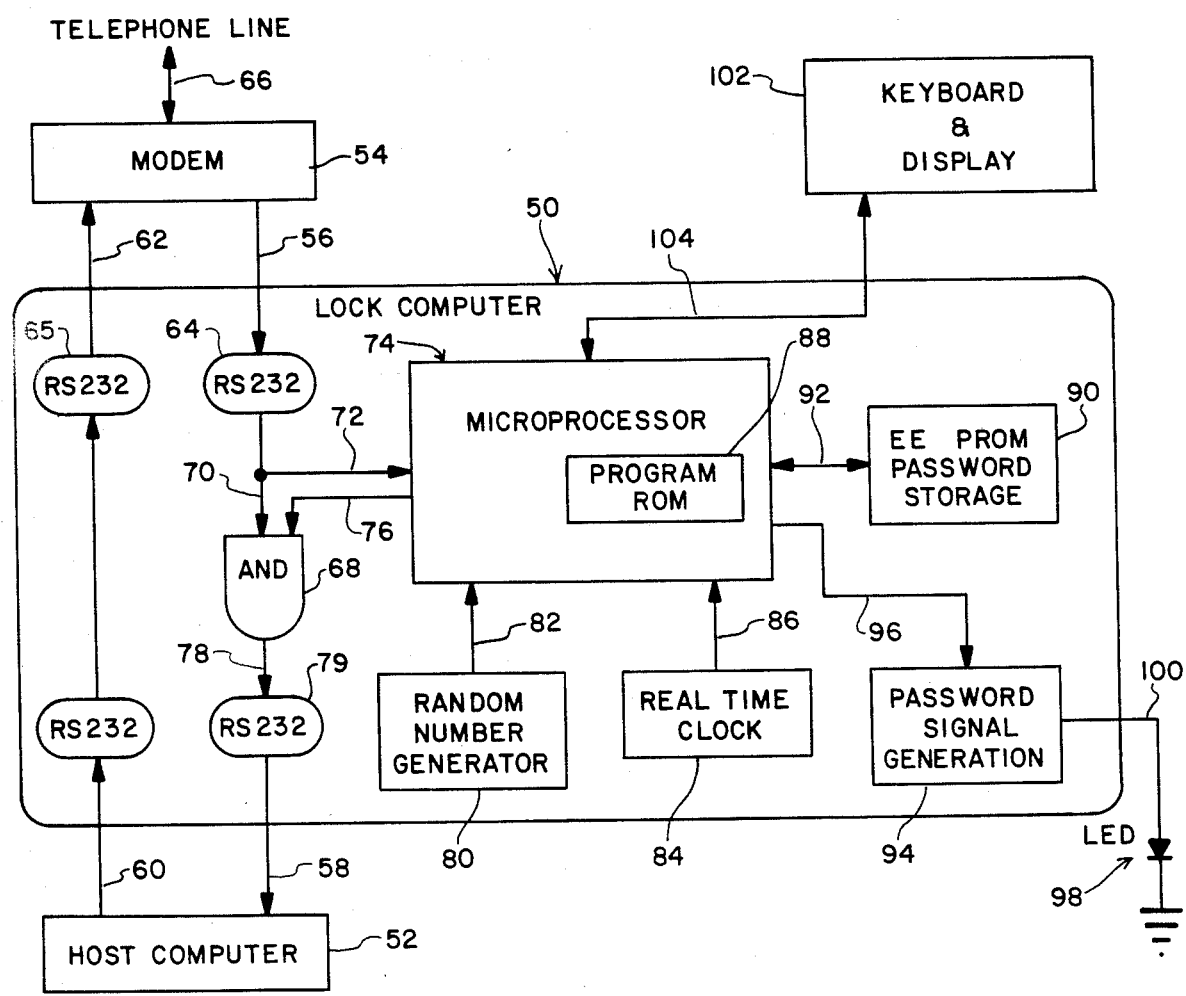
FIG. 2 is a block diagram of an interface unit in accordance with the invention.

FIG. 2 shows the interface unit or lock computer 50, which is used with the password generator 10 to control access to a host computer 52. The lock computer 50 is connected between the host computer 52 and a modem 54 by lines 56, 58, 60 and 62 and RS232 channels 64 and 65. The modem 54 is connected to a telephone line 66 in a conventional manner. The RS232 channel 64 of the lock computer 50 includes an AND gate 68, connected to receive input signals on line 70. The input signals are also supplied on line 72 to microprocessor 74, which can be implemented with the same type of integrated circuit as the microprocessor 12 in FIG. 1. The microprocessor 74 provides an enable input on line 76 to the AND gate 68. The output of AND gate 68 is connected by lines 78 and 58 and RS232 channel 79 to host computer 52. The RS232 channel 64 provides the input signals to the host computer 58 when such input signals and the enable signal are provided as inputs to AND gate 68.

The microprocessor 74 is connected to a random number generator 80 by line 82 and to a real time clock by line 86. The microprocessor 74 generates a pseudo-random number sequence on the basis of a seed input from the random number generator 80 and the real time clock 84 under control of a program stored in ROM 88.

The microprocessor 74 is also connected to an electronically erasable programmable read only memory (EEPROM) 90 by line 92 and to signal generator 94 by line 6. A pseudo-random number sequence generated by the microprocessor 74 in response to the seed inputs from the random number generator 80 and the real time clock 84 is stored in EEPROM 90 along with an identification of the password generator 10 to which the random number sequence is to be supplied, and is also supplied to signal generator 94 for loading into the password generator 10 of FIG. 1. The signal generator 94 is connected to LED 98 by line 100. The microprocessor 74 is connected to a keyboard and display 102 by line 104.

When the pseudo-random number sequence is generated, the microprocessor 74 also generates a user personal identification number to be loaded with the pseudo-random sequence in the password generator. This personal identification number is shown on display 102 along with the identification of the password generator in which the pseudo-random number sequence and personal identification number are stored. Since the personal identification number is used by the password generator only for comparison with a user-entered password prior to generating a valid password, the personal identification number need not be stored in the EEPROM 90 of the lock computer 50.

In order to load a pseudo-random number sequence and a personal identification number generated by the microprocessor 74 into the password generator 10 prior to supplying the password generator 10 to a user, the generator 10 is positioned so that optical sensor 28 will receive light inputs from the LED 98. At the time the pseudo-random number sequence and personal identification number is loaded into the password generator 10, the clock 30 of the password generator 10 and the clock 84 of the interface unit 50 are synchronized. When the password generator 10 containing the pseudo-random number sequence is supplied to a user, the user is given the personal identification number associated with that pseudo-random number sequence, and the identification of the password generator, which may be the user's name or a number. The personal identification number stored in the password generator 10 must be supplied by the user through keyboard 14 to enable the password generator so that it will generate a password, and both the password generated by the password generator 10 and the identification of the password generator are supplied by the user in the process of gaining access to a host computer. The personal identification number is not transmitted to the lock computer 50 in the process of gaining access.

In use, the user enters the personal identification number through the keyboard 14. The password generator compares the entered personal identification number and the stored personal identification number. If they match, the password generator 10 utilizes a portion of the pseudo-random number sequence, for example, six digits of the sequence, and the time signal from clock 30 to generate a password for access to host computer 52. The so-generated password is shown on display 18. The user then enters the password and generator identification through a terminal used to access the host computer 52.

In order to obtain a valid password, a user must enter the proper personal identification number into the password generator 10. If an improper personal identification number is entered into the password generator 10, it will respond with a number that looks like a valid password, but which will not allow access to the host computer 52. The password generated by the password generator 10 in response to the proper personal identification number changes during time periods defined by the clock 30, for example every minute.

When a password generated by the password generator 10 and the identification of the generator 10 are supplied as inputs on line 56, they are supplied on line 72 to the microprocessor 74. The microprocessor 74 compares the password input on line 72 with a password generated during the same time interval by the lock computer 50 on the basis of the same portion of the stored pseudo-random number sequence identified by the generator identification and a time signal from clock 84, which is synchronized with clock 30. If there is a match, AND gate 68 is enabled and access to host computer 52 is granted. Inputs from the user terminal are then permitted, and outputs from the host computer 60 are supplied back to the user terminal through RS232 channel 65. To allow for drift between the clock 84 in the lock computer 50 and the clock 30 in the password generator 10, the lock computer 50 can be programmed to compare an input password with passwords generated for adjacent time intervals.

In practice, a variety of algorithms known in the art can be used to generate the pseudo-random number sequence. A suitable example of such an algorithm is contained in Knuth, D., Fundamental Algorithms, Art of Computer Programming, Vol. II, "Semi Numerical Algorithms", pp 1-172, especially p. 172 (Addison-Wesley, 1981). The true random number seed supplied by generator 80 of the pseudo-random number sequence can be generated by known methods, such as by using the least significant digits of a high speed clock at an arbitrary time defined, for example, by a key closure, or by using a noise source input.

Figure 3:
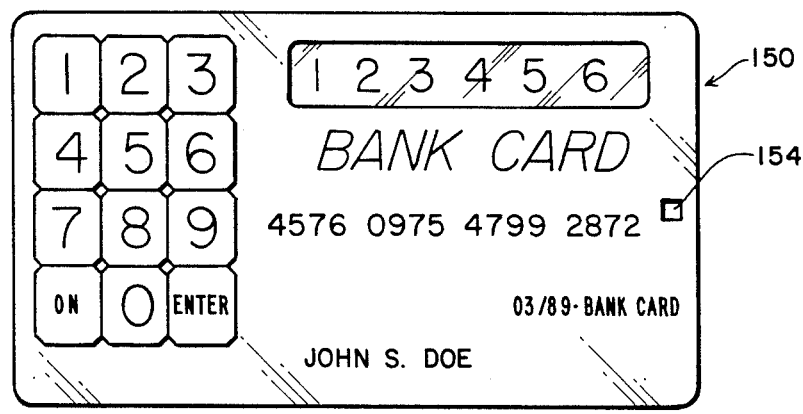
FIG. 3 is a front view of a remote password generator in accordance with the invention.
Figure 4:
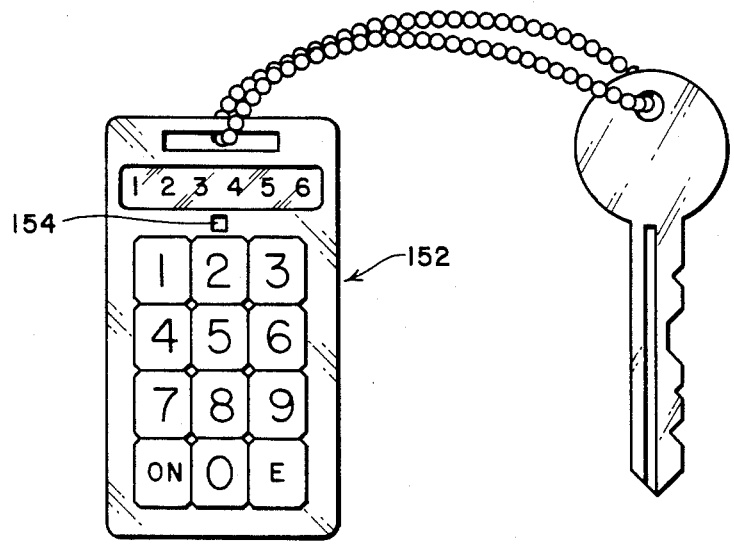
FIG. 4 is a front view of another embodiment of a password generator in accordance with the invention.
Figure 5:
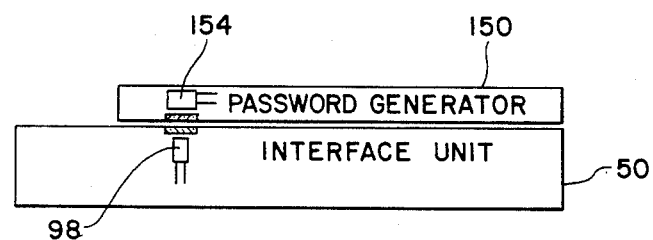
FIG. 5 is a side view, partly in cross section, of the interface of FIG. 2 and the password generator of FIG. 3 at on step in their use.

The password generator 10 is of simple enough construction that it can be embodied as shown in FIG. 3 as a form 150 resembling a credit card, or as a key chain 152 as shown in FIG. 4. Providing the password generator 10 in such forms helps to remind the user to safeguard the password generator in the same manner as a credit card or key. As shown in FIG. 5, the credit card form 150 of the password generator is placed face down on the interface unit 50, so that a phototransistor 154 or other light sensitive detector is over LED 98 during loading of the random number sequence. The key chain form 152 of the password generator is positioned in a similar manner during loading.

Figure 6:
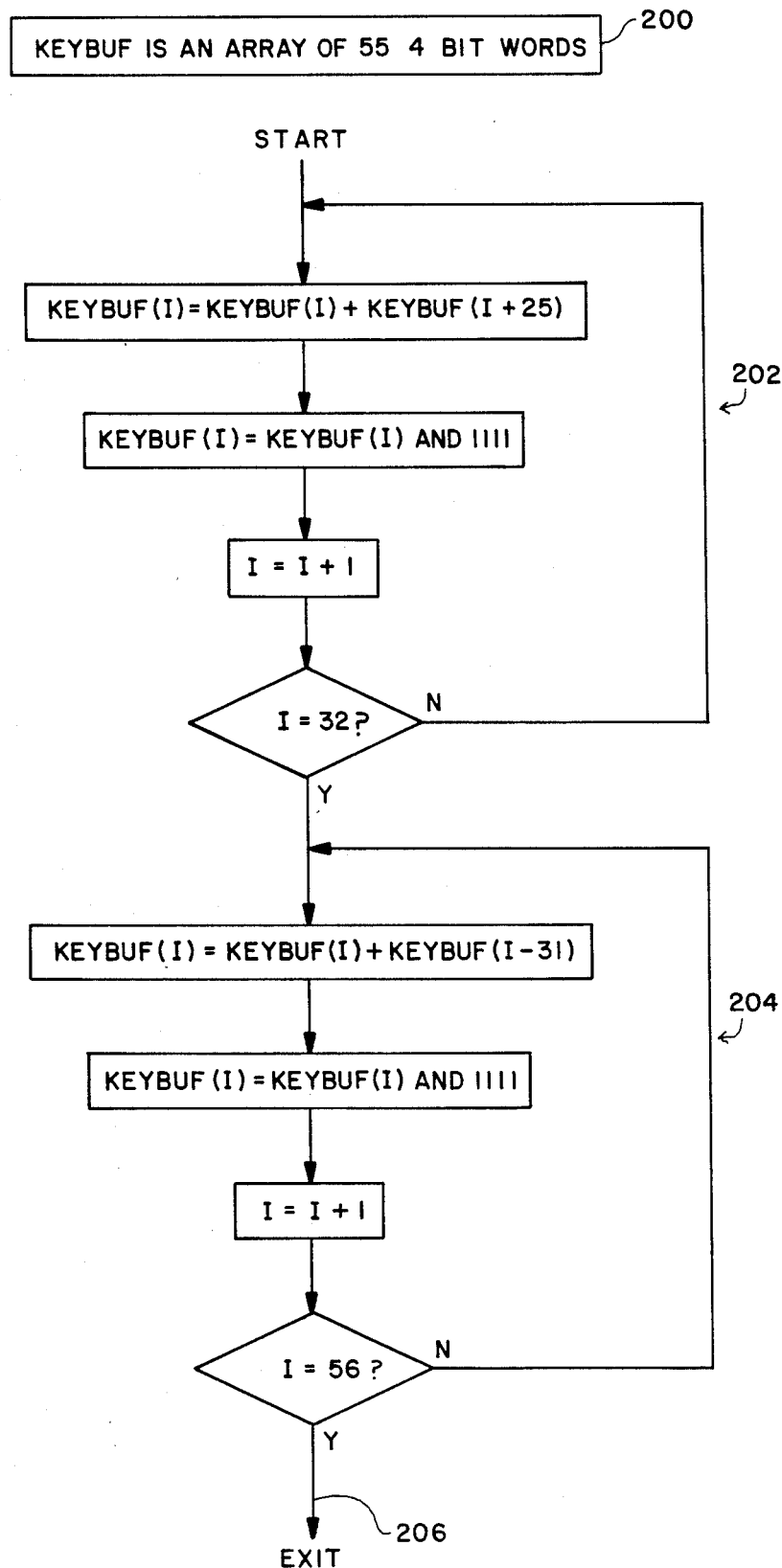
FIG. 6 is a software flow chart useful for understanding the invention.

Further details on the program used to generate and update passwords are available in the software flow chart of FIG. 6. For purposes of this explanation, it is assumed that the pseudo-random number sequence used to generate passwords is a 55 digit number, assigned the variable name KEYBUF, as indicated at 200. The individual 4 bit words of the array are identified by the designation of KEYBUF(I). For I of from 1 to 31, the values of KEYBUF(I) are calculated as shown in upper loop 202 of the flow chart. When I is incremented to 32, the values of KEYBUF(I) are calculated as shown in lower loop 204 of the flow chart, until I is incremented to 56, which exits the program, as shown at 206. The routine of FIG. 6 is used both by the lock computer 50 to generate original password pseudo-random number sequences and to update its password pseudo-random number sequences with time and by the password generator 10 to generate updated password number sequences from the original password number sequence, after the original password pseudo-random number sequence has been loaded into the password generator 10 by the lock computer 50. All subsequent password number sequences for a particular password generator 10 are generated by both the password generator 10 and the lock computer 50 as updates of the last password number sequences for that password generator 10, using the routine of FIG. 6. The two loops 202 and 204 of the routine are provided for hardware reduction purposes, and the routine could be implemented with a single incrementing loop if desired. In practice, the password generator 10 does not display the entire 55 digit password number sequence for use by the user to access host computer 52. For most applications, a six digit portion is adequate.

Figure 7:
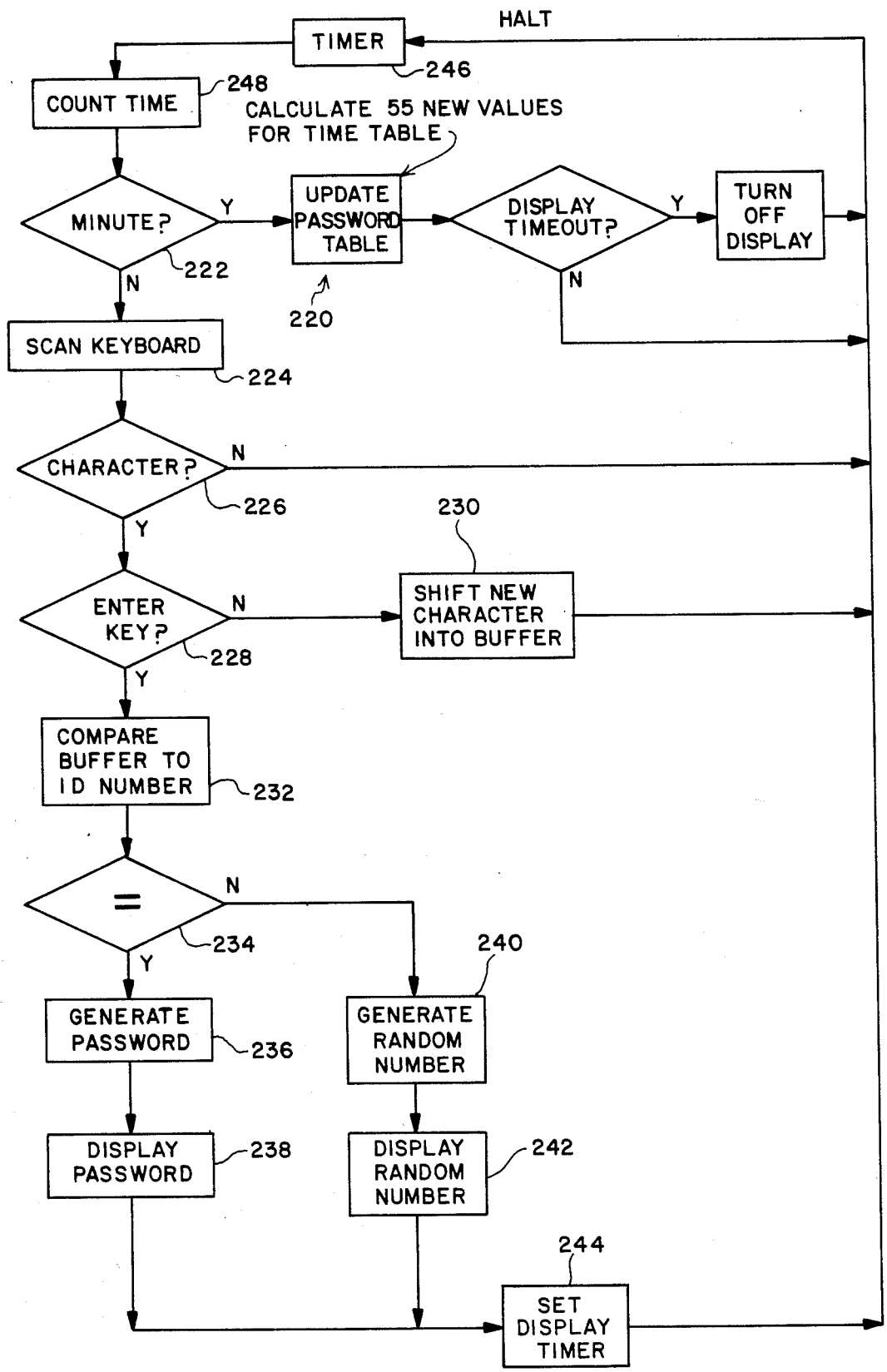
FIG. 7 is another software flow chart useful for understanding the invention.

FIG. 7 is a flow chart of the control program for the password generator 10, which is stored in program ROM 24 (FIG. 1). A similar program is provided in program ROM 88 of the lock computer 50 (FIG. 2).

The flow chart of FIG. 7 assumes that a 55 digit pseudo-random number has been generated by the lock computer 50, using the routine of FIG. 6, and that number has been stored in the password generator 10, along with a user personal identification number. The 55 digit pseudo-random number used, after comparison of a user entered personal indentification number with the stored personal identification number, to generate the passwords is updated with time by loop 220 once every minute, as determined by decision block 222. Other than during the calculation of a new pseudo-random number, keyboard 14 is periodically scanned for key closures, as indicated at block 224. If a key closure is detected, as indicated by decision block 226, a determination whether the key closure is the enter key is made, as indicated by decision block 228. If the key closure is not the enter key, the character corresponding to the key closure is shifted into a keyboard buffer included within microprocessor 12, as indicated at 230. Successive characters are shifted into the buffer until an enter key closure is detected. At that time, the contents of the keyboard buffer are compared with the personal indentification number stored in RAM 26, as indicated at 232. If the comparison is valid, as indicated at decision block 234, the current 55 digit pseudo-random number is used to generate a password for access to computer 52, as indicated at 236, which is shown as a six digit password on LCD display 18, as indicated at 238.

If the comparison at 234 is not valid, the password generator 10 generates and displays a random number, as indicated at 240 and 242, which is in the same apparent form as a valid password generated and displayed at 236 and 238. Operation in this manner means that an unauthorized user cannot tell from the operation of the password generator 10 whether his entries have produced a valid password without actually using the displayed number for attempting access to computer 52. For either a valid password or a random number, the number is shown on display 18 for a predetermined period of time, as indicated at 244, then a new cycle of operation is begun by timer 246 through counting a time interval, as indicated at 248.

In an alternative mode of operation, if the personal identification number is not stored in the password generator 10, no comparison is made, and the password generator simply uses whatever personal identification number that is entered with keyboard 14 and the current stored pseudo-random number sequence to generate a password, with the correct personal identification number being required to generate the same password as generated by the lock computer 50. In that mode of operation, the valid personal identification number is stored in the lock computer 50. One way of using the personal identification number and the current pseudo-random number sequence to generate passwords in the password generator 10 and in the lock computer 50 is by exclusive ORing the personal identification number and a predetermined six digits of the pseudo-random number sequence. This mode of operation further simplifies the password generator 10. Other than as described, the construction and operation of a password generator 10 and lock computer 50 incorporating this form of the program is the same as with the FIG. 7 program.

During operation, the lock computer 50 assumes the seven states described below.

1. Idle State

Modem 54 is in the auto-answer mode. The transmit data and receive data lines 62 and 56 are connected so that command and status can be communicated between the host computer 52 and the modem 54. This configuration is necessary for many commercially available modems, such as the Hayes Smartmodem, since all command and status signals are communicated over the RS232 channel. Other modems may have different control procedures.

2. Answer

Modem 54 sends lock computer 50 a signal indicating that it has answered the telephone on line 66 and has made a connection to a terminal. At this time, the lock computer 50 responds by disabling the transmit data line 62 so that no outbound signal from the host computer 52 can be transmitted.

3. User I.D.

The terminal sends a typical password introduction consisting of a command such as "LOGON", followed by the user identification, corresponding to the user identification stored in lock computer 50 at the time the password generator 10 was loaded. This user I.D. is usually a number or the user's name. The password as generated by the password generator 10 is transmitted next.

4. Look Up Password

The interface unit 50 looks up the stored password in the EEPROM 90. The stored password is the 55 digit number stored in a table and addressed by the user I.D. member and referenced to the time of the last update. The stored password must be brought up to the current time by serially calculating the password for each time increment until a time about 3 minutes prior to the current time is reached. A corresponding portion of the updated, stored password is compared to the input password, received on line 56. The stored password is updated and compared until about 3 minutes past the current time is reached. If the stored password and the input password are equal at any time in this window, the input password is accepted. If there is no valid comparison during the window, the password is rejected. Allowing such a window compensates for any drift between the clocks of the password generator 10 and the interface unit 50.

The most recent update of the stored password should be stored back into the EEPROM 90 so that not as much calculation needs to be done for the next sign on by the user. The stored passwords must be updated periodically. Probably the best time is once a day during a quiet period. Each password must be calculated serially for each time increment. If the time increment is one minute, 1,440 calculations must be made for each password each day.

5. Accept Password

If the password is accepted, the lock computer 50 sends a synthesized password sequence to the host computer 2 and reconnects the transmit data line 62 to the modem 54.

6. Reject Password

If the password is rejected, the lock computer 50 can disconnect the telephone line 66 and send a message to the host computer 52. The lock computer 50 can also keep track of failed sign ons for a particular user identification, and lock out any attempt to sign on if there are more than a certain number of failed sign ons within a certain time period.

7. End of Session

The modem 54 must indicate the end of a session so that the lock computer 50 can revert to the idle mode. There is a potential problem if both direct and remote access from terminals to the host computer 52 is employed. Therefore, the end of session should be determined by detecting a sign off message, by hanging up the telephone for a modem, or by timing out after a period of no activity on the connection. Very often people with direct connections leave the connection open without signing off after use. The time out mode for detecting an end of session will lock up a direct connection terminal in the absence of a sign off message, so that further access from the direct connect terminal will require another password generated by the generator 10.

The password generator is a device that can be used to provide a secure signature for transmission on communication channels. The device is very similar to a small handheld calculator with small keyboard and display. The operator keys a personal identification number into the password generator and a password is displayed. The password changes each time the personal identification number is entered. If an incorrect combination is entered, the password generator displays a password which looks as valid as any other password but will not work in the computer.

The interface unit is connected to the computer. It allows entry to the computer only if a valid password from the password generator is detected. The interface unit contains the identical algorithm for generating passwords as the password generator. The only source for a valid password except by pure chance is to have physical possession of the proper password generator and know the personal identification number. Each password generator generates a different set of passwords, derived from a seed provided series of pure random numbers determined by the interface unit at the time the password generator is activated. An interface unit can serve many different users, each with a different password generator. Since the user must have the password generator in his physical possession and also know the personal identification number, there is no way to broadcast a number granting access on a computer bulletin board or to other users.

The system of this invention can be used with a variety of computer systems, e.g., a single computer or an entry point to a network of computers. It is also possible to have password generators share the same password sequence, comparable to automobile keys. There may be 1,000 or 10,000 password sequences on a computer and a million users. As long as the user doesn't know which other users share the same password sequence, the system is secure. Several computers could share the same list of sequences. This approach would be necessary where several computers were available to a user or for installations with a large list of users, such as commercial information utilities. A more secure system has a single password sequence per user.

The algorithm for generating the pseudo-random number sequences is very simple and very secure. In the most secure configuration, the pseudo-random number sequences are stored in the password generator and the interface unit and never distributed anywhere. No one, including the system operators, ever knows what the pseudo-random number sequences are. If a pseudo-random sequence generator is used, a very long sequence of random-looking numbers is generated, for example more than 1 million bytes long. The sequence is not truly random because it will eventually repeat, but it appears to be random and will pass most of the probability tests for random numbers. The passwords generated by the password generator 10 represent only a small selection of the numbers in the pseudo-random number sequence. Without access to the full sequence, it is very difficult or practically impossible to predict the next number in the sequence.

The password generation algorithm is based on having more or less synchronized clocks. Each clock generates a very long sequence of pseudo-random numbers. When the password generator is accessed by keying in the correct personal identification number, it displays a few digits of the pseudo-random sequence as the password. Most of the digits are not displayed, so that the user does not have access to enough of the sequence to be able to break the code. The sequence is updated once per minute by both the password generator and the interface unit. When the interface unit receives a password, it looks in the time window for the correct password. The time window is long enough to encompass passwords which could have been generated one or two minutes either side of the correct time, so that clock drift can be accommodated.

For a highly secure system, the password generators should be updated every month or so to keep the passwords as secure as possible. To break the system, an analyst must have the algorithm for generating the pseudo-random sequence and determine the personal identification number. In practice, it would be very difficult to break this code. However, to be safe, the random number sequence can be regenerated fairly often, for example, after every 100 or 1,000 uses, depending on the frequency of remote access by the user. The problem of decryption is much harder than normal communication signals. The passwords are not plain text and have no meaning in themselves. It is useless to scan the combinations until a meaningful word pops out. A random number has no distinguishing features from another random number.

The password generator is configured so that attempts to read out the contents of its memory would destroy the data. The circuitry, including a power source, such as a long life lithium battery with a life of five to ten years, can be potted, so that it will be destroyed or the power will be interrupted if an attempt is made to get at the microprocessor.

An interface unit for a single modem or terminal requires only about 8K bytes of memory to store over 100 random number sequences and personal identification codes, which would probably be sufficient for a small business. For larger systems, correspondingly larger memory capacity is required.

It should now be apparent to those skilled in the art that a password generator and interface unit for connection to a host computer capable of achieving the stated objects of the invention has been provided. By basing the generation of passwords on entry of a personal identification number, a pseudo-random number sequence, and a time period established by synchronized clocks, controlled computer access and password security are maintained. The password generator is simple in construction and easily activated and regenerated by the interface unit. The password generator may be configured to promote user association with security.

It should further be apparent to those skilled in the art that various changes in form and detail of the invention as shown and described may be made. For example the password generator could be incorporated as part of a remote terminal. The password generation circuits would then accept commands from the terminal keyboard to generate the passwords and then transmit the passwords without manual entry by the user. A stand alone password generator could also be designed for transmission of the password when generated, such as by touch tones, to eliminate manual entry by the user. The password generator could also be used as a form of smart credit card. Since the passwords change every minute or two, there is no possibility of copying numbers of charge slip carbons or forging the card. Other forms of corresponding information in the password generator and the interface unit could be used to generate the passwords at each unit. It is intended that such changes be included within the spirit and scope of the claims appended hereto.

What is claimed is:

1. A system for remote access by a user to a computer, which comprises a plurality of password generators, each user having one of the password generators, an interface remotely accessible by the user and connected to said computer, means for loading equivalent information into one of the password generators and the interface for generation of the passwords, said interface and said password generators each including a clock, said interface and said password generators each including means for generating the same passwords from the equivalent information at corresponding clock time periods in said one password generator and said interface using the equivalent information and an input from said clock as data to generate the same passwords in said one password generator and said interface, with the passwords changing for each successive time period, said interface including means for comparing a transmitted password generated by said one password generator during the clock time period with a password generated by said interface during the clock time period, so that identity of the transmitted password generated by said one password generator during the clock time period with the password generated by said interface allows access to said computer through said interface, and for comparing the transmitted password generated by said password generator with the changed passwords generated by said interface for a plurality of adjacent time periods in the absence of identity between the compared passwords generated by said one password generator and said interface, to compensate for non-coincidence of the clock time periods of generation of the compared passwords.

2. The system of claim 1 in which said password generator includes a user entry means connected to supply a personal identification number to said password generator and said means for generating the passwords includes means for generating the passwords in response to entry of the personal identification number assigned to said password generator.

3. The system of claim 2 in which said means for generating the passwords generates an invalid password in response to entry of a personal identification number other than the personal identification number assigned to said password generator.

4. The system of claim 3 in which a pseudo-random number sequence and the clock time period are used by said password generator to generate the password, said password generator comparing the entered personal identification number with a stored personal identification number, said password generator generating the invalid password when the entered and the stored personal identification numbers fail to compare.

5. The system of claim 3 in which a pseudo-random number sequence, the clock time period and the entered personal identification number are used by said password generator and the pseudo-random number sequence, the clock time period and a stored personal identification number are used by said interface to generate the passwords.

6. The system of claim 2 in which said interface assigns an identification to the password generator into which the equivalent information is loaded and stores the password generator identification associated with the equivalent information in said interface, said interface retrieving the stored equivalent information in response to signal inputs corresponding to the password generator identification.

7. An interface unit for connection to a computer input for controlling access to the computer, which comprises means for receiving a signal input and for selectively supplying the signal input to said computer input, means for storing password generation information, means for generating passwords connected to receive the password generation information from said storage means, said password generating means being connected to receive an input password from said signal input means for comparison with a generated password, and a clock connected to supply a time input to said password generating means, said password generating means including means for generating a password from the information in said storage means and the time input using the information and the time input from said clock as data to generate the password, with the passwords changing for each successive time period, for comparison with an input password from said signal input means, said password generating means being connected to control said signal input means, so that coincidence of a generated password and an input password causes said password generating means to enable said input signal means to supply input signals to the computer, said interface unit including means for comparing the input password with the changed passwords generated by said interface unit for a plurality of adjacent time periods in the absence of identity between the generated and input passwords, to compensate for non-coincidence of clock time periods of generation of the input and generated passwords.

8. The interface unit of claim 7 additionally comprising a password generation information signal transmission means connected to receive the password generation information from said password generation means for transmission to a password generator.

9. The interface unit of claim 8 in which said interface unit assigns an identification to the password generator to which the password generation information is transmitted, and stores the password generator identification associated with the password generation information in said storage means, said interface unit retrieving the stored password generation information from said storage means in response to signal inputs at said signal input receiving means corresponding to the password generator identification.

10. The interface unit of claim 8 in which said password generation information signal transmission means includes means for transmitting the password generation information to the password generator optically.

* * * * *